US012340100B2

(12) United States Patent
Farhoodfar et al.

(10) Patent No.: US 12,340,100 B2
(45) Date of Patent: *Jun. 24, 2025

(54) MEMORY ALLOCATION AND REALLOCATION FOR PROGRAM INSTRUCTIONS AND DATA USING INTERMEDIATE PROCESSOR

(71) Applicant: Marvell Asia Pte Ltd, Singapore (SG)

(72) Inventors: Arash Farhoodfar, Sunnyvale, CA (US); Whay Lee, Milpitas, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/544,745

(22) Filed: Dec. 19, 2023

(65) Prior Publication Data

US 2024/0118819 A1  Apr. 11, 2024

Related U.S. Application Data

(63) Continuation of application No. 17/225,789, filed on Apr. 8, 2021, now Pat. No. 11,861,190.

(51) Int. Cl.
*G06F 3/06* (2006.01)
(52) U.S. Cl.
CPC .......... *G06F 3/0631* (2013.01); *G06F 3/0604* (2013.01); *G06F 3/0673* (2013.01)
(58) Field of Classification Search
CPC ..... G06F 3/0631; G06F 3/0604; G06F 3/0673
(Continued)

(56) References Cited

U.S. PATENT DOCUMENTS 5,301,295 A * 4/1994 Leary .................... G06F 9/3802
712/E9.055
5,386,537 A * 1/1995 Asano ................. G06F 15/7857
712/E9.046

(Continued)

FOREIGN PATENT DOCUMENTS

| CN | 102007477 A | 4/2011 |
| IN | 201917019855 A | 8/2019 |
| WO | WO-0233504 A2 | 4/2002 |

OTHER PUBLICATIONS

"Harvard Architecture" Wikipedia, https://en.wikipedia.org/w/index.php?title=Harvard_architecture&oldid=10003537540, Mar. 17, 2021.

*Primary Examiner* — Kenneth M Lo
*Assistant Examiner* — Alexander Vinnitsky

(57) ABSTRACT

A system includes memory, a controller and a processor. The controller receives program instructions to program the controller to perform function, and handle data as a result of performing the function. The processor: performs an initial configuration of a map to proportion the memory including allocating first and second portions of the memory for the program instructions and the data, the map being indicative of addresses of the first and second portions; subsequent to performing the initial configuration, reconfigures the map to change amounts of the memory allocated for the program instructions and the data, and prior to and subsequent to reconfiguring the map and based on the map, routes the program instructions and data between the controller and the memory, stores the program instructions at the addresses of the memory allocated for the program instructions, and stores the data at the addresses of the memory allocated for the data.

20 Claims, 4 Drawing Sheets

(58) Field of Classification Search
USPC .......................................................... 711/154
See application file for complete search history.

(56) References Cited

U.S. PATENT DOCUMENTS

| | | | | |
|---|---|---|---|---|
| 7,996,647 B2* | 8/2011 | Zdenek | ............... | G06F 9/30098 |
| | | | | 711/100 |
| 2008/0147990 A1* | 6/2008 | Pesavento | ........... | G06F 12/0895 |
| | | | | 711/E12.052 |
| 2008/0184072 A1* | 7/2008 | Odlivak | .............. | G06F 11/3628 |
| | | | | 714/E11.207 |
| 2016/0011802 A1* | 1/2016 | Berke | ................... | G06F 3/0619 |
| | | | | 711/166 |
| 2016/0172014 A1* | 6/2016 | Waidhofer | .......... | G06F 12/0284 |
| | | | | 711/106 |
| 2019/0004810 A1* | 1/2019 | Jayasimha | .............. | G06F 13/28 |

\* cited by examiner

MEMORY ALLOCATION AND REALLOCATION FOR PROGRAM INSTRUCTIONS AND DATA USING INTERMEDIATE PROCESSOR

CROSS-REFERENCE TO RELATED APPLICATIONS

The present disclosure is a continuation of U.S. patent application Ser. No. 17/225,789 filed on Apr. 8, 2021 (U.S. Pat. No. 11,861,190 issued on Jan. 2, 2024). The entire disclosure of the application referenced above is incorporated herein by reference.

BACKGROUND

The present invention is directed to systems and methods for allocating blocks of Random Access Memory (RAM).

Microprocessors are increasingly called upon to perform complex functions in various computer architectures. Such microprocessors typically communicate with memory such as RAM in order to store data.

However, the RAM is also typically responsible for storing the computer code that provides instructions for the microprocessor to perform the various functions. This dual use of RAM for storing both data and instructions, can lead to inefficient consumption of RAM capacity, performance bottlenecks, and unwanted competition for memory resources.

SUMMARY

Embodiments relate to the allocation of RAM blocks for a microcontroller that has two separate memory subsystems. One memory subsystem stores instruction information; the other memory subsystem stores data information. Separate and distinct ports of the microcontroller are dedicated to handling the instruction information and the data information.

At design time, a designer creates an address map implementing various possible RAM block configurations. These configurations represent different ways of allocating instruction information and data information amongst the RAM blocks that are available.

At runtime, a configuration signal is received. Based upon that configuration signal, a particular RAM block configuration within the address map for storing instruction information and data information is determined.

An incoming instruction signal is received from the dedicated port of the microcontroller. Based upon the configuration signal and characteristics of the instruction signal, the address map is referenced to control connection point(s). Possible examples of such connection points can include, but are not limited to: pins, fuses, and registers.

Via the configured connection point, the instruction signal is routed to an appropriate memory block that has been allocated to store exclusively instruction information. Similarly, based upon the configuration signal and the address map, an incoming data signal received from the dedicated port of the microcontroller is routed to an appropriate memory block allocated to store exclusively data information.

BRIEF DESCRIPTION OF DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DESCRIPTION

The present invention is directed to systems and methods of allocating RAM. According to embodiments, methods and apparatuses of optimizing the access to RAM are provided.

Figure 1:
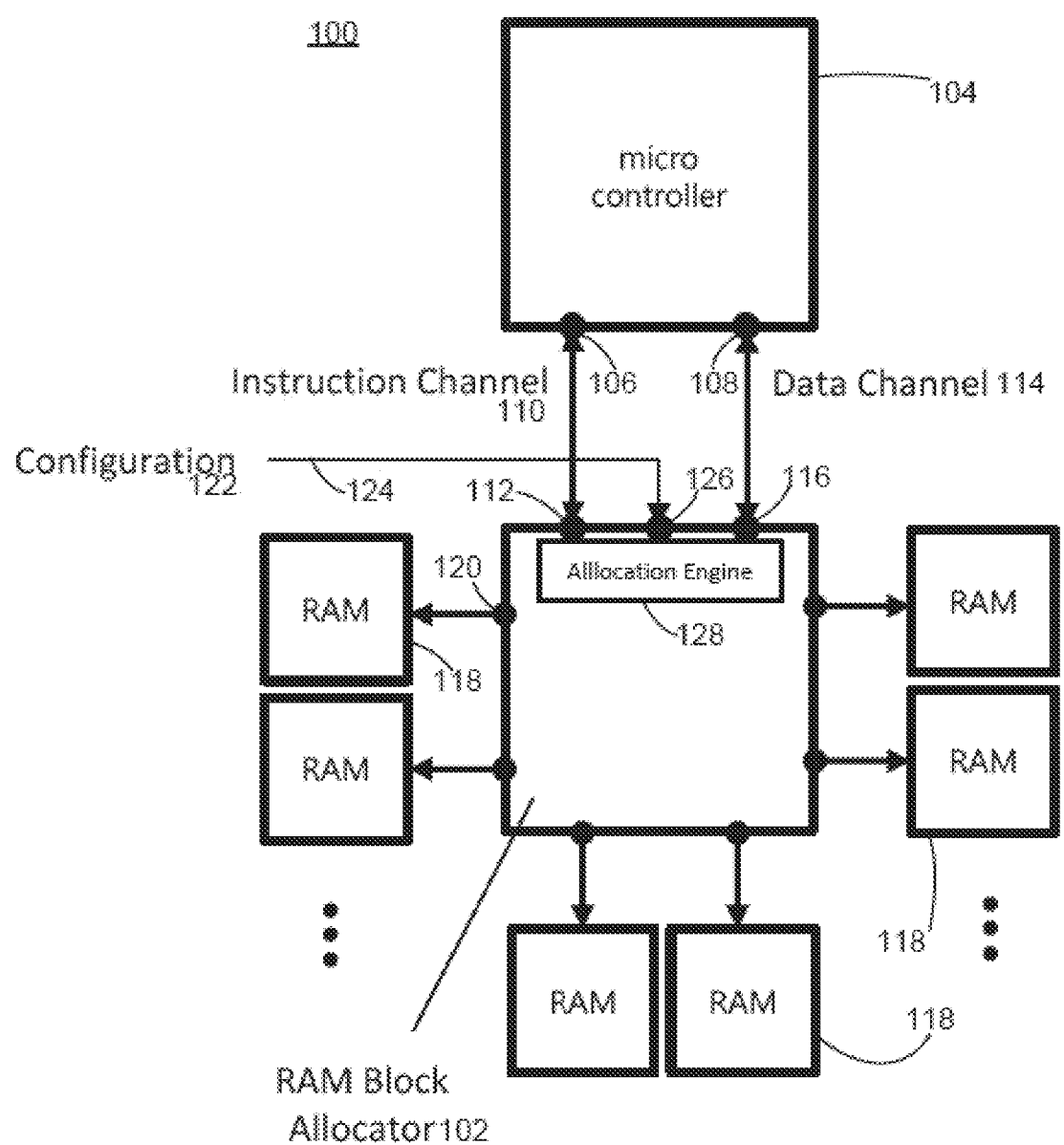
FIG. 1 illustrates a simplified block diagram of a microprocessor in communication with an RAM block allocator according to an embodiment.

FIG. 1 illustrates a simplified block diagram of a system 100 comprising a RAM block allocator 102 according to an embodiment, in communication with a microcontroller 104 comprising an instruction port 106 and a data port 108.

Here, the microcontroller includes separate infrastructure dedicated to processing either:
instructions for performing programming, or
data that is handled (stored, retrieved, modified) by that programming.

The RAM block allocator and microcontroller are in communication via two separate channels:
instruction channel 110 in communication with respective instruction ports 106 and 112; and
data channel 114 in communication with respective data ports 108 and 116.

The instruction channel and the data channel are indirectly coupled to at least two RAM blocks 118 (one block exclusively for instructions, one block exclusively for data) via respective RAM ports 120 of the (configurable) RAM block allocator.

Storage capacity of memory blocks in communication with the instruction channel may be combined logically to serve as instruction memory for the microcontroller. Capacity of memory blocks in communication with the data channel may be combined logically to serve as data memory.

Program instructions are typically stored in the instruction memory, while the data upon which it operates is commonly stored in the data memory. Generally, a memory block connected to the data channel cannot be used to store program instructions, and a memory block connected to the instruction channel cannot be used to store program data.

However some applications may require a larger amount of data, while other applications may involve a larger program size. Accordingly, it may be difficult for the designer to predict in advance, how much memory should be physically connected to the instruction versus data channels. Such an up-front decision by the designer, may undesirably later result in insufficient allocation of memory space of one type, while excess memory of the other type is left idle.

Accordingly, embodiments of the present invention allow configurable allocation of memory blocks as between instruction storage and data storage purposes, utilizing the RAM block allocator. Specifically, by referencing incoming configuration signal 122 sent via configuration line 124 and received at configuration port 126, an allocation engine 128 of the RAM block allocator may be configured at product deployment time to:

logically associate at least one of the available memory blocks with the instruction channel; and logically associate at least one of the remaining available memory blocks to the data channel.

This configuration allows the designer to determine at deployment time, how much of the available memory is allocated for those two (data, instruction) purposes. This achieves flexibility together with high performance. In particular, the separate channels dedicated to instructions and data prevent bottlenecks that might arise if only a single channel were used for one memory access at a time.

Figure 2:
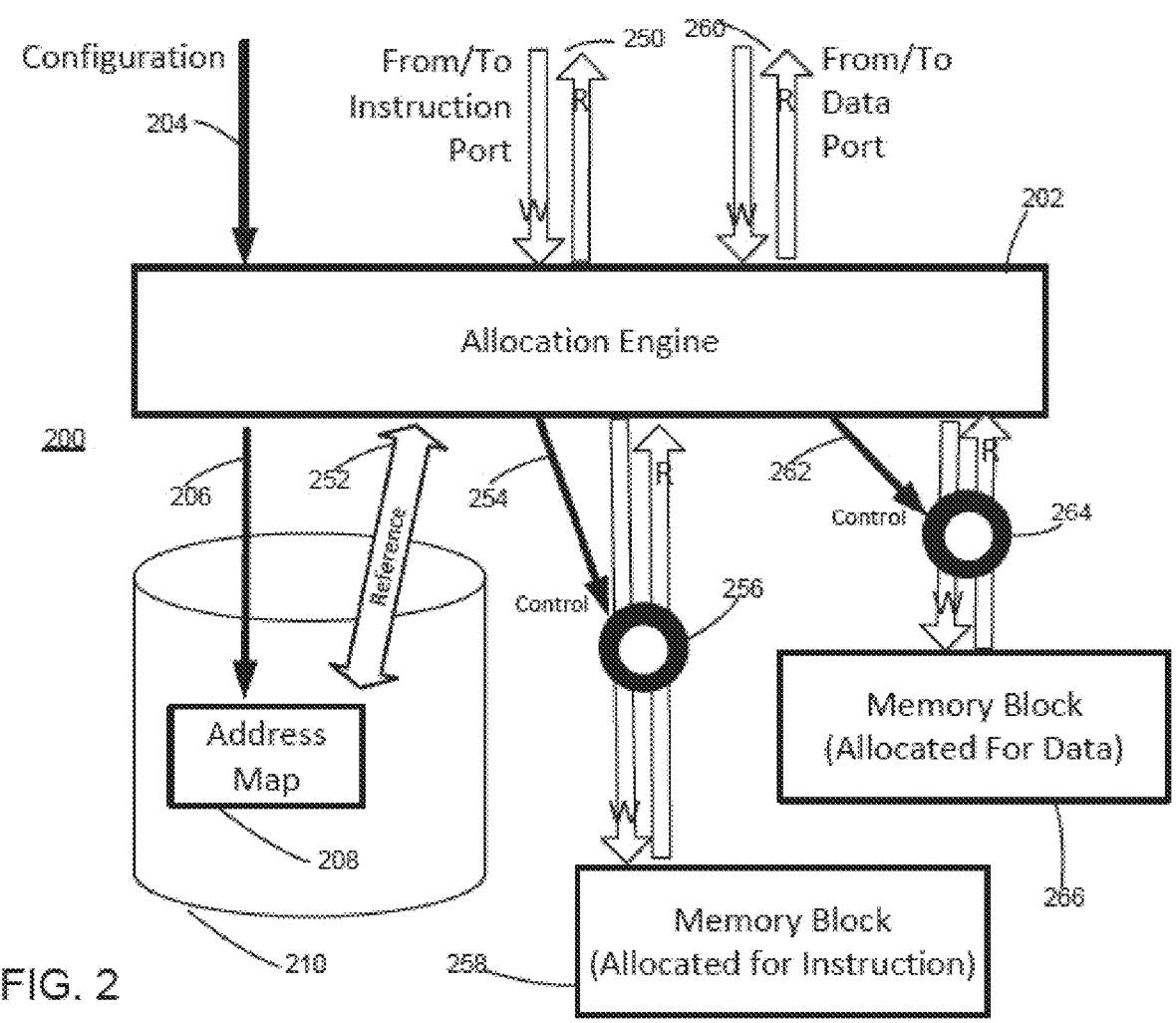
FIG. 2 is a simplified block diagram illustrating the operating environment of the allocation engine according to an embodiment.

FIG. 2 is a simplified block diagram illustrating the operating environment 200 of an allocation engine 202 according to an embodiment.

At runtime, configuration signal 204 is received. That configuration signal is transmitted by a designer and received at a configuration port of the RAM allocator. This configuration signal indicates the memory that is to be specifically allocated for storage of instruction information, and the memory that is to be specifically allocated for storage of data information.

The allocation engine processes the configuration signal, and in response generates 206 an address map 208 containing particular details for the routing of incoming instructions and data for storage in appropriate memory blocks allocated thereto. The address map is stored in a non-transitory storage medium 210 accessible to the allocator engine, for later reference.

An incoming instruction signal 250 is received by the allocation engine. That instruction signal may be a read or a write.

The allocation engine references 252 the address map 208, and in response issues a control signal 254 to a connection point 256. As a result, the instruction signal is routed through the connection point to memory block 258 that has been allocated to store exclusively instruction information.

Also at runtime, an incoming data signal 260 is received by the allocation engine. That instruction signal may again be a read or a write.

The allocation engine references 252 the address map 208, and in response issues a control signal 262 to a different connection point 264. As a result, the data signal is routed through the connection point to memory block 266 that has been allocated to store exclusively data information.

Figure 3:
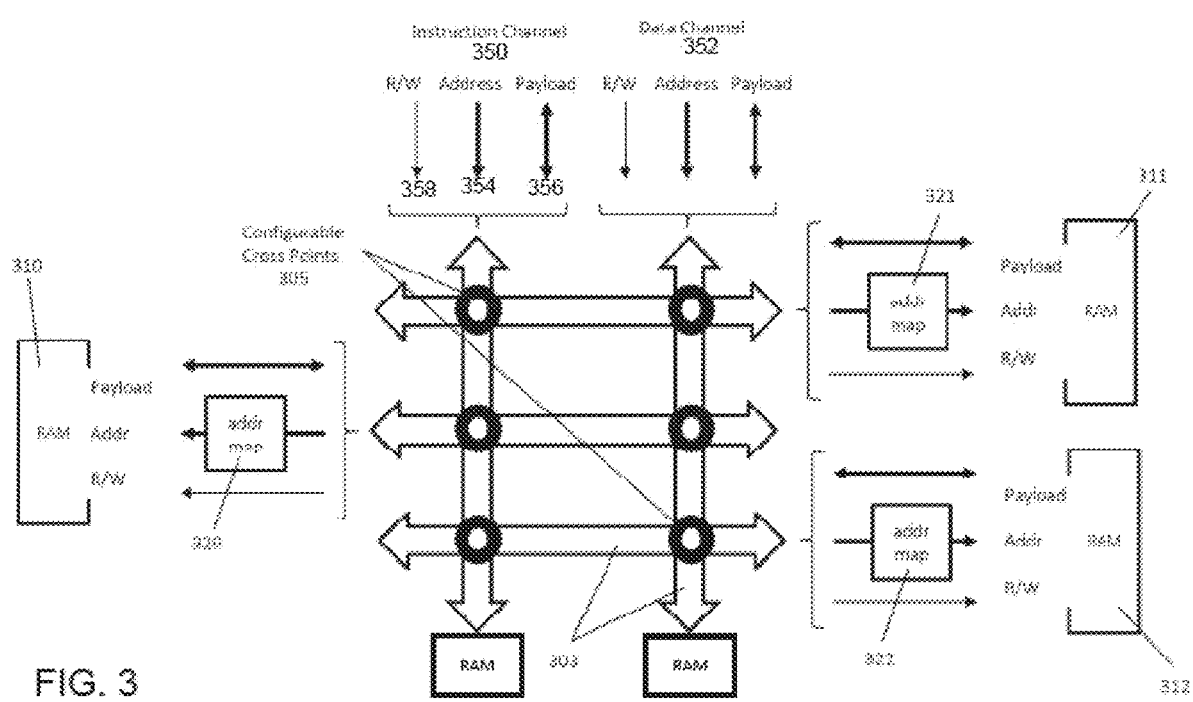
FIG. 3 shows details of a RAM block allocator according to an embodiment.

FIG. 3 illustrates a detailed view of a RAM allocator according to an embodiment. The instruction channel 350 and data channel 352 emanating from the ports of the microcontroller, are shown at the top side of the diagram.

Each of those (instruction, data) channels may typically comprise an Address bus 354, a Payload bus 356, and a Read/Write (R/W) signal 358. The R/W signal determines if a READ or WRITE access is to be performed.

As an example, only three RAM memory blocks 310-312 are shown in FIG. 3. Each memory block may have its own Address, Payload and R/W signals.

It is noted that each such memory block may be in the form of discrete memory chips that are soldered down onto a Printed Circuit Board (PCB) if the processor/memory complex is implemented on a system board. Alternatively, the memory block may be in the form of a memory "chiplet" or a RAM macro block, if the processor/memory complex is implemented as an integrated chip.

For ease of illustration, the combined Address, Payload, and R/W signals of the Instruction/Data Channels and the memory blocks are represented as broad busses 303 in the middle of FIG. 3.

Thick dark circles in the diagram represent configurable cross points 305. These cross points may be activated at deployment time in order to selectively couple each of the memory blocks appropriately to the instruction channel or the data channel.

For example, memory block 310 may be configured to be coupled to the instruction channel such that instruction accesses would be routed to memory block 310. Memory blocks 311 and 312 may be coupled to the data channel such that Data accesses are routed to those RAM blocks.

Configurable Address Map units 320, 321, 322 ensure that each memory block responds to (and only to) the addresses allocated to that block. For example, if memory block 311 has a capacity of 2Kwords, while 312 has a capacity of 1Kwords, the RAM block allocator may be configured to map the first 2Kword of its Data Memory to 311, and the next 1Kword to 312.

Subsequently, when a Data Channel READ access to word address "2176" is received, Address Map 321 may prevent memory block 311 from responding. Address Map 322 causes memory block 312 to return the content of its physical location "128" (since "2176"–"2048"="128").

This description of the configurable cross points 305, the address mapping units 320, 321, 322, and other elements shown in FIG. 3 represents one possible exemplary embodiment of the current invention. Examples of RAM block allocators may be implemented through one or more different mechanisms, including but not limited to:

configuration pins, integrated programmable eFuses, simple configuration registers, or other relevant mechanisms.

For a sophisticated CPU, RAM block allocation could be implemented utilizing a simple micro-controller, micro-sequencer, or some Look Up Table (LUT), to provide flexibility in operation.

Figure 4:
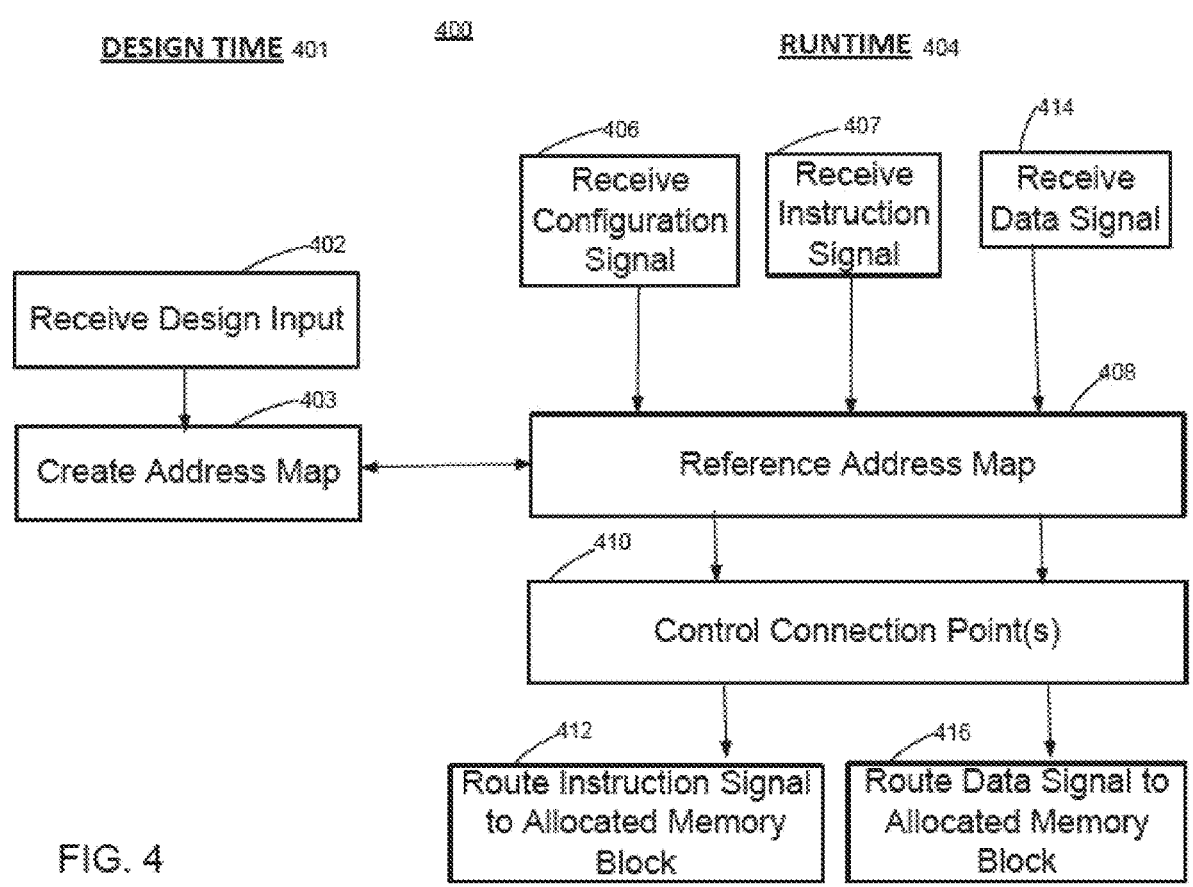
FIG. 4 is a simplified flow chart showing a method according to an embodiment.

FIG. 4 is a simplified flow chart showing a method 400 according to an embodiment. During design time 401, a design input 402 is received from a designer.

At 403, an address map is created and stored. This address map includes a plurality of configurations for allocating instruction information and data information between available memory blocks.

During runtime 404, a configuration signal is received 406. This configuration signal determines a particular configuration for allocating instruction information and data information between available memory blocks.

At 407, an incoming instruction signal is received. At 408, the address map is referenced based upon the configuration signal and the characteristics of the instruction signal.

At 410, a connection point (e.g., pin, fuse, register) is controlled based upon the address map. At 412, the instruction signal is routed to an appropriate memory block that has been allocated to store exclusively instruction information.

At 414, an incoming data signal is received. Returning to 408, the address map is again referenced based upon the characteristics of the data signal.

Returning to 410, a different connection point is then controlled based upon the reference to the address map. At 416, the data signal is routed to a different memory block that has been allocated to store exclusively data information.

Embodiments of a RAM allocator according to embodiments, may offer one or more benefits. For example, embodiments afford a degree of flexibility for the designer to allocate at deployment time, the available memory to different purposes. This flexibility is allowed while still taking advantage of the performance that comes with having multiple independent (data, instruction) memory channels.

EXAMPLE

To illustrate the mapping for RAM block allocation according to an exemplary embodiment, consider the following simplified scenario. A system has three RAM blocks, of sizes 64 KB, 32 KB, and 16 KB.

At design time, the following two possible exemplary configurations are included in the address map.

| Config # | RAM #1 (64 KB) | RAM #2 (32 KB) | RAM #3 (16 KB) | Total Instruction Memory | Total Data Memory |
|---|---|---|---|---|---|
| A | Allocate to INST | Allocate to INST | Allocate to DATA | 96 KB (64 + 32) | 16 KB |
| B | Allocate to INST | Allocate to DATA | Allocate to DATA | 64 KB | 48 KB (32 + 16) |

Here, in Config #A, there is 96 KB worth of instruction memory. This instruction memory may be accessible via an address range such as 0x0_0000-0x0_5FFF (assuming each location is 32 bits wide).

In Config #A, there is also 16 KB worth of data memory. This data memory may be accessed via another address range such as 0x8_0000-0x8_0FFF (again assuming 32 bits per location).

These particular addresses just mentioned above, are given as examples for purposes of illustration only. Accesses beyond those mapped ranges have undefined behavior, since that is all the memory that is available.

In this case, when an instruction access comes in from the dedicated microcontroller port via the instruction channel, the memory allocator needs to look at the given address, and route it to one of RAM blocks #1 or #2. For example, it may be such that 0x0_0000-0x0_03FFF (16K×32 bits=64 KB) is mapped to RAM #1, and 0x0_4000-0x0_5FFF is mapped to RAM #2.

Let us say the incoming address is 0x0_4001. The allocator would cause the 2nd location of RAM #2 to be accessed by this request, the 1st location of RAM #2 being mapped to 0x0_4000.

Similarly, if Config #B were used, the allocator would perform a corresponding mapping for RAM #2 and RAM #3, upon a data access.

For implementation, the available memory may comprise more than the three RAM blocks described in the simple example above. And, various configurations implemented within the address map created at design time, can allow different combinations of those RAM blocks to be allocated.

Specifically, at design time the number of available memory blocks may be determined and fixed, and a number of supported configurations {A, B, C, D . . . } may be chosen by the designer. The designer may choose to support all possible combinations of allocating instruction/data between available memory blocks for full flexibility, or to support a subset thereof in order to reduce design complexity.

Those chosen configurations (and their corresponding mappings) are designed into the address map (e.g., 208 in FIG. 2), and made known to the software programmer.

At deployment time, the programmer chooses from amongst the supported configurations, by supplying the configuration signal (e.g., 204 in FIG. 2). No provision is made for the programmer to choose an unsupported configuration not already designed into the address map at design time.

While the above is a full description of the specific embodiments, various modifications, alternative constructions and equivalents may be used. Given the various applications and embodiments as described herein, the above description and illustrations should not be taken as limiting the scope of the present invention which is defined by the appended claims.

What is claimed is:

1. A system comprising:
   first memory;
   a controller configured to receive program instructions to program the controller to perform at least one function, and handle data as a result of performing the at least one function; and
   a processor configured to
      perform an initial configuration of a first map to proportion the first memory including allocating a first portion of the first memory for the program instructions and a second portion of the first memory for the data, the first map being indicative of addresses of the first portion and other addresses of the second portion,
      subsequent to performing the initial configuration, reconfigure the first map to change an amount of the first memory allocated for the program instructions and an amount of the first memory allocated for the data, and
      prior to and subsequent to reconfiguring the first map and based on the first map, route the program instructions and the data between the controller and the first memory, store the program instructions at the addresses of the first memory allocated for the program instructions, and store the data at the addresses of the first memory allocated for the data.

2. The system of claim 1, wherein:
   during the initial configuration, the processor is configured to allocate the addresses of the first portion for the program instructions and allocate the addresses of the second portion for the data;
   the first map is indicative of the addresses of the first portion allocated for the program instructions and the addresses of the second portion allocated for the data; and
   subsequent to performing the initial configuration and the reconfiguring of the first map, the reconfigured first map is indicative of addresses of the first memory allocated for the program instructions and other addresses of the first memory allocated for the data due to the change in the proportioning of the first memory.

3. The system of claim 1, wherein the controller is configured, when performing the at least one function, to at least one of store the data at the addresses of the first memory allocated for the data, retrieve the data from the addresses of the first memory allocated for the data, and modify the data.

4. The system of claim 1, further comprising:
a first port defining a first channel dedicated to transferring the program instructions; and
a second port defining a second channel dedicated to transferring the data,
wherein the processor is configured to receive the program instructions from the first memory via the first channel, and to transfer the data between the controller and the processor via the second channel.

5. The system of claim 4, further comprising a plurality of channels separate from the first port, the second port, the first channel and the second channel and transferring the program instructions and the data between the processor and the first memory.

6. The system of claim 4, wherein the processor comprises a plurality of connection points through which the program instructions and the data pass between the controller and the first memory, the plurality of connection points being separate from the first port, the second port, the first channel and the second channel.

7. The system of claim 4, wherein:
the first memory comprises a plurality of distinct memories; and
the processor comprises a two-dimensional array of configurable cross-points connected between i) the first port and the second port, and ii) the first memory, the two-dimensional array of configurable cross-points configured to enable selective routing of the program instructions and the data between the controller and the plurality of distinct memories.

8. The system of claim 1, wherein the processor is configured to reconfigure the first map to change a total number of addresses of the first memory allocated for the program instructions and a total number of the addresses of the first memory allocated for the data.

9. The system of claim 1, wherein:
the first memory comprises a plurality of memory blocks; and
the first map maps addresses of the first memory to local addresses of the plurality of memory blocks.

10. The system of claim 1, wherein the processor is configured to receive a first configuration signal from a configuration line and, based on the first configuration signal, to configure the first map to allocate the addresses of the first memory allocated for the program instructions and allocate the other addresses of the first memory allocated for the data.

11. The system of claim 10, wherein the processor is configured to at least one of:
based on the first configuration signal, allocate a first amount of the first memory for storing the program instructions and to allocate a second amount of the first memory for storing the data, the first configuration signal indicative of the first amount of the first memory and the second amount of the first memory; and
receive a second configuration signal from the configuration line and, based on the second configuration signal, reconfigure the first map to change the amount of the first memory allocated for the program instructions and to change the amount of the first memory allocated for the data.

12. The system of claim 1, wherein:
the first memory comprises a plurality of memory blocks;
the processor is configured to configure a plurality of maps, the plurality of maps comprising the first map;
each of the plurality of maps is allocated to a respective one of the plurality of memory blocks, a one-to-one relationship exists between the plurality of maps and the plurality of memory blocks; and
each of the plurality of maps mapping corresponding ones of addresses of the first memory to local addresses within a respective one of the plurality of memory blocks.

13. The system of claim 1, wherein:
the first memory comprises a plurality of memory blocks; and
the processor is configured to selectively configure the first map to allocate selected ones of the plurality of memory blocks for storing information provided in the program instructions and to allocate other selected ones the plurality of memory blocks for storing the data.

14. The system of claim 1, wherein the processor is configured i) to receive a configuration signal from a configuration line and, ii) based on the configuration signal, to configure the first map to be in a configuration selected from among a plurality of possible configurations, each of the plurality of possible configurations allocating addresses of the first memory for the program instructions and the data differently, and each of the plurality of possible configurations allocating in different proportions a respective number of addresses of the first memory for the program instructions and a respective number of addresses for the data.

15. The system of claim 1, wherein:
the first memory comprises a plurality of memory blocks; and
the processor comprises a plurality of cross-points and is configured i) to receive a configuration signal from a configuration line separate from the system, and ii) based on the configuration signal, to at least one of set or control the plurality of cross-points, the plurality of cross-points being configured to enable selective routing of the program instructions and the data between the controller and the plurality of memory blocks.

16. The system of claim 15, wherein the plurality of cross-points comprise at least one of configuration pins, integrated programmable fuses, or configuration registers.

17. The system of claim 1, wherein:
the first memory comprises a plurality of memory blocks;
the plurality of memory blocks are implemented as a plurality of integrated circuits such that each of the plurality of memory blocks is a distinct memory chip; and
the processor comprises a plurality of ports configured to transfer the program instructions and the data between the processor and the plurality of memory blocks.

18. The system of claim 1, further comprising a single printed circuit board,
wherein the first memory, the controller and the processor are mounted on the single printed circuit board.

19. The system of claim 1, wherein:
the system is implemented as an integrated circuit or an integrated processor, wherein the integrated circuit comprises a second memory separate from the first memory; and
the second memory configured to store the first map.

20. A method of proportioning and controlling access of memory in a system, the method comprising:
receiving program instructions at a controller to program the controller to perform at least one function, and handling data via the controller as a result of performing the at least one function;

routing using a processor the program instructions and the data between the controller and the memory;

performing using the processor an initial configuration of a map to proportion the memory including allocating a first portion of the memory for the program instructions and allocating a second portion of the memory for the data, the map being indicative of addresses of the first portion and other addresses of the second portion;

subsequent to performing the initial configuration, reconfiguring the map to change an amount of the memory allocated for the program instructions and an amount of the memory allocated for the data; and prior to and subsequent to reconfiguring the map and based on the map, routing the program instructions and the data between the controller and the memory, storing the program instructions at the addresses of the memory allocated for the program instructions, and storing the data at the addresses of the memory allocated for the data.

* * * * *